UNITED STATES PATENT OFFICE.

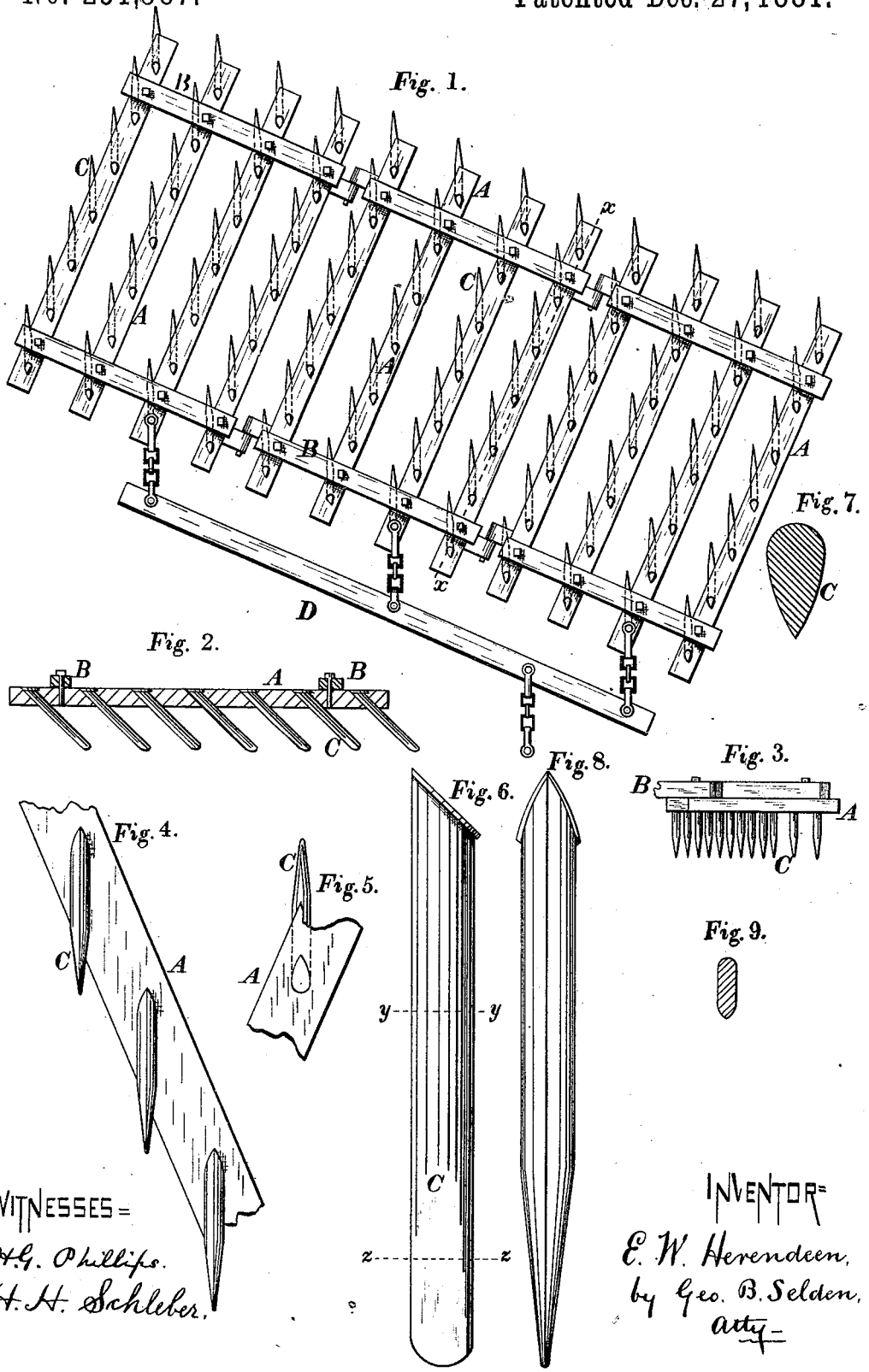

EDWARD W. HERENDEEN, OF GENEVA, NEW YORK.

HARROW.

SPECIFICATION forming part of Letters Patent No. 251,587, dated December 27, 1881.

Application filed May 31, 1881. (No model.)

*To all whom it may concern:*

Be it known that I, EDWARD W. HERENDEEN, of Geneva, New York, have invented certain new and useful Improvements in Harrows, of which the following is a specification, reference being had to the accompanying drawings.

My invention relates to an improvement on the harrow patented to me October 24, 1871; and it consists in giving the inclined teeth an improved form, whereby they are better adapted to slicing or pulverizing the earth; and it also consists in providing the inclined sharp-edged teeth with heads on their upper ends, whereby they are firmly secured in the harrow-frame.

In the accompanying drawings, representing my improved harrow, Figure 1 is a plan view. Fig. 2 is a longitudinal section of one of the bars on the line $x\ x$, Fig. 1. Fig. 3 is a partial front view. Fig. 4 is a partial inverted view of one of the bars and the teeth. Fig. 5 is an enlarged plan view of a portion of a bar and tooth. Fig. 6 is a side view of a tooth on an enlarged scale. Fig. 7 is an enlarged cross-section of the tooth on the line $y\ y$, Fig. 6. Fig. 8 is a front view of my improved harrow-tooth. Fig. 9 is a section of the same on the line $z\ z$, Fig. 6.

In the accompanying drawings, representing my improved harrow, A A A are the bars in which the teeth C C are inserted; B B, the cross-ties, and D the draft-bar.

The harrow-frame is constructed in any usual manner, consisting preferably of two or more sections hinged together, and provided with a draft-bar for the attachment of the horses.

The teeth consist of metallic bars flattened sidewise, and provided on their forward sides with a cutting-edge, as shown in the sectional view, Fig. 7. The teeth are beveled on each side for a short distance above their lower ends, as shown in Figs. 6 and 8, for the purpose of forming a wide and thin edge at the points, possessing great wearing capacity. A point of this form will remain sharp during a long period of use. It cannot grow shorter until the whole width of the tooth is worn off, and after that it will decrease in length very slowly. The teeth are inserted obliquely through the bars A in planes parallel with each other and with the line of draft, but at an angle sidewise and backward with the length of the bar. The opening in the bar through which the teeth are inserted also makes an angle with the length of the bar, as represented in Fig. 5. The openings are made of a form corresponding to that of the body of the teeth, which are firmly driven therein, and for greater security the upper ends of the teeth are upset or forged into heads, which prevent the teeth from being drawn through the bar. The heads come flush with the upper surface of the bar, thereby securing a neat appearance and facilitating the finishing of the frame-work. The teeth are so arranged relatively to each other in the bars that no two teeth follow each other in the same path, so that the land will receive from them the most thorough pulverization.

The advantages possessed by a harrow containing my improved teeth over those employing the round teeth heretofore in use will be readily understood. As the line of draft is parallel with the plane of the teeth, the cutting-edges on the forward sides of the teeth move over the soil with a cutting or slicing action from above downward, thereby securing the most efficient action on the ground with a reduction of friction, and consequent ease of draft. The inclined sharp-edged teeth are also less liable to become choked or clogged than the round teeth. My improved teeth are also more durable, possessing a greater capacity for work and being less liable to wear off unequally.

I claim—

1. As a new article of manufacture, a harrow-tooth having a flat cutting-edge and rounded rear edge and wide beveled lower portion, and provided with a flat head set at an angle to the line of the cutting-edge, substantially as shown and described.

2. The herein-described harrow-tooth C, in combination with the frame provided with inclined apertures for the reception of said tooth, and corresponding in cross-section to the shape thereof, substantially as shown and described.

EDWARD W. HERENDEEN.

Witnesses:
GEO. B. SELDEN,
H. G. PHILLIPS.